United States Patent [19]

Saitou et al.

[11] Patent Number: 4,846,536
[45] Date of Patent: Jul. 11, 1989

[54] PORTABLE APPARATUS

[75] Inventors: Yoshio Saitou; Katumaru Sasaki, both of Ome, Japan

[73] Assignee: Kabushiki Kaisha Toshiba, Kawasaki, Japan

[21] Appl. No.: 67,889

[22] Filed: Jun. 30, 1987

[30] Foreign Application Priority Data

Jun. 30, 1986 [JP] Japan ............................. 61-98840[U]

[51] Int. Cl.⁴ ............................................ A47B 81/06
[52] U.S. Cl. ...................................... 312/72; 312/208
[58] Field of Search ................ 312/208, 7.2; 248/1 A, 248/1 B, 1 F, 1 H, 1 I; 340/711; 358/254; 400/600, 682, 711, 784; 16/308, 304, 307, 337, 366

[56] References Cited

U.S. PATENT DOCUMENTS

| | | | |
|---|---|---|---|
| 458,228 | 8/1891 | Elliott | 16/337 X |
| 1,126,067 | 1/1915 | Nolte | 16/307 |
| 2,509,462 | 5/1950 | Vogel | 16/307 X |
| 2,707,799 | 5/1955 | Butterfield | 16/308 X |
| 2,878,531 | 3/1959 | Benham | 16/308 X |
| 4,199,075 | 4/1980 | Rohrer | 16/308 X |
| 4,496,943 | 1/1985 | Greenblatt | 340/700 X |
| 4,521,021 | 6/1985 | Dixon | 358/254 X |
| 4,663,670 | 5/1987 | Ito et al. | 358/254 X |
| 4,684,017 | 8/1987 | Watanabe et al. | 16/366 X |

FOREIGN PATENT DOCUMENTS

| | | | |
|---|---|---|---|
| 58242 | 8/1982 | European Pat. Off. | 312/7.2 |
| 3202046 | 7/1983 | Fed. Rep. of Germany | 358/254 |
| 1247711 | 10/1960 | France | 16/308 |
| 616814 | 1/1949 | United Kingdom | 16/307 |

OTHER PUBLICATIONS

IBM Technical Disclosure Bulletin, vol. 28, No. 6, Six Point Hinge Mechanism, 11/1985, 2 pages.

Primary Examiner—Peter A. Aschenbrenner
Assistant Examiner—Thomas A. Rendos
Attorney, Agent, or Firm—Oblon, Fisher, Spivak, McClelland & Maier

[57] ABSTRACT

A hinge mechanism is disclosed which couples the flat-panel display of a portable apparatus to the housing of the apparatus. The flat-panel display can be folded upon the housing, and the apparatus looks like an attache case. The hinge mechanism has a torsion bar. The torsion bar is fastened, at one end, to the hinge mechanism. The other end portion of the torsion bar is flat and held by a holder such that the torsion bar is prevented from rotating around its axis, but can move in its axial direction. The axis of the hinge mechanism is defined by hollow cylindrical bosses inserted in circular holes cut in the hinge mechanism. The force which the torsion bar generates when it is twisted comes into equilibrium with the force urging the display to fall down toward the housing when the display reaches a position close to the housing. Hence, the panel display stops at this position. The gap between the housing and the panel display held in this position is so broad that an operator never has his or her fingers pinched between the housing and display. Safety can thus be secured to the operator in case display suddenly falls down toward the housing. In addition, the risk of damages to the panel display and the housing can be minimized.

5 Claims, 7 Drawing Sheets

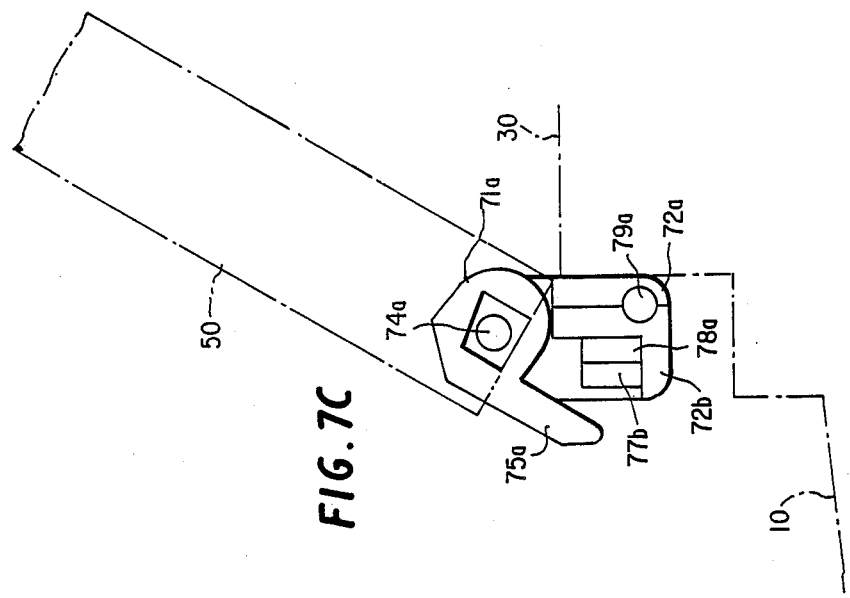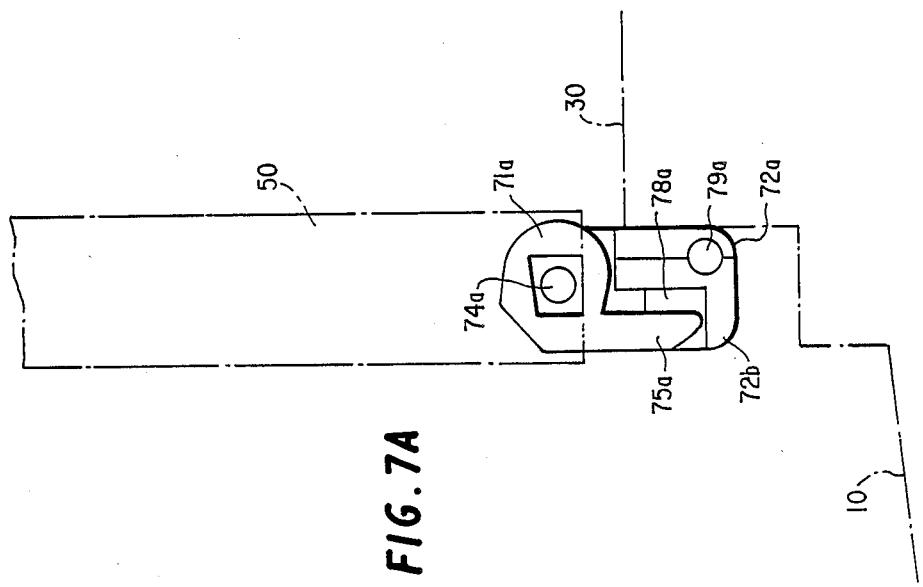

PORTABLE APPARATUS

BACKGROUND OF THE INVENTION

1. (Field of the Invention)

The present invention relates to a portable apparatus comprising a base and a flat-panel display which can be folded upon the housing, and more particularly, to a hinge mechanism for coupling the display to the base.

2. (Description of the Prior Art)

Recently, apparatuses such as personal computers and word processors have been miniaturized to a portable, hand-held size. Each of these portable apparatuses has a large, flat-panel display unit, such as a liquid crystal display (LCD) or a plasma display. The flat-panel display unit is coupled by a hinge mechanism with the base of the apparatus, which has a keyboard and other components. The display unit can be folded upon the keyboard. When the display unit is folded upon the keyboard, the portable apparatus looks like an attache case and is compact enough to be carried.

The conventional hinge mechanism used in the portable apparatus of this type is made rigid and strong enough to prevent the flat-panel display unit from abruptly falling down onto the keyboard under its own weight. However, the hinge mechanism is too strong, making it difficult for the operator to open and close the flat-panel display unit. To make matters worse, the hinge mechanism is gradually worn as the display unit are repeatedly opened and closed, and there is the possibility that the display unit suddenly falls down onto the keyboard under its own weight. Such a sudden fall of the display unit may injure the operator's fingers or does damage to the keyboard or the display unit itself.

SUMMARY OF THE INVENTION

One object of the present invention to make it possible to open and close a flat-panel display unit smoothly.

Another object of the invention is to ensure safety for an operator and a portable apparatus against possible injury or damage resulting from a sudden fall of a flat-panel display unit under own weight.

In order to achieve the above objects, a portable apparatus according to the present invention comprises a display means for displaying pictures on display surface, base means for supporting the display means by hinge means, and torsion bar means. The base means has an upper surface. The hinge means has an axis. The display means rotates toward and away from the upper surface around the axis. The display surface faces the upper surface of the base when closed and exposed to a viewer when opened. The torsion bar means stops rotation of the display means toward the upper surface due to own weight.

BRIEF DESCRIPTION OF THE DRAWINGS

Other objects and features of the present invention will be apparent from the following description taken in connection with the accompanying drawings, in which.

DETAILED DESCRIPTION OF THE INVENTION

One embodiment of the invention will now be described with reference to the accompanying drawings.

Figure 1:
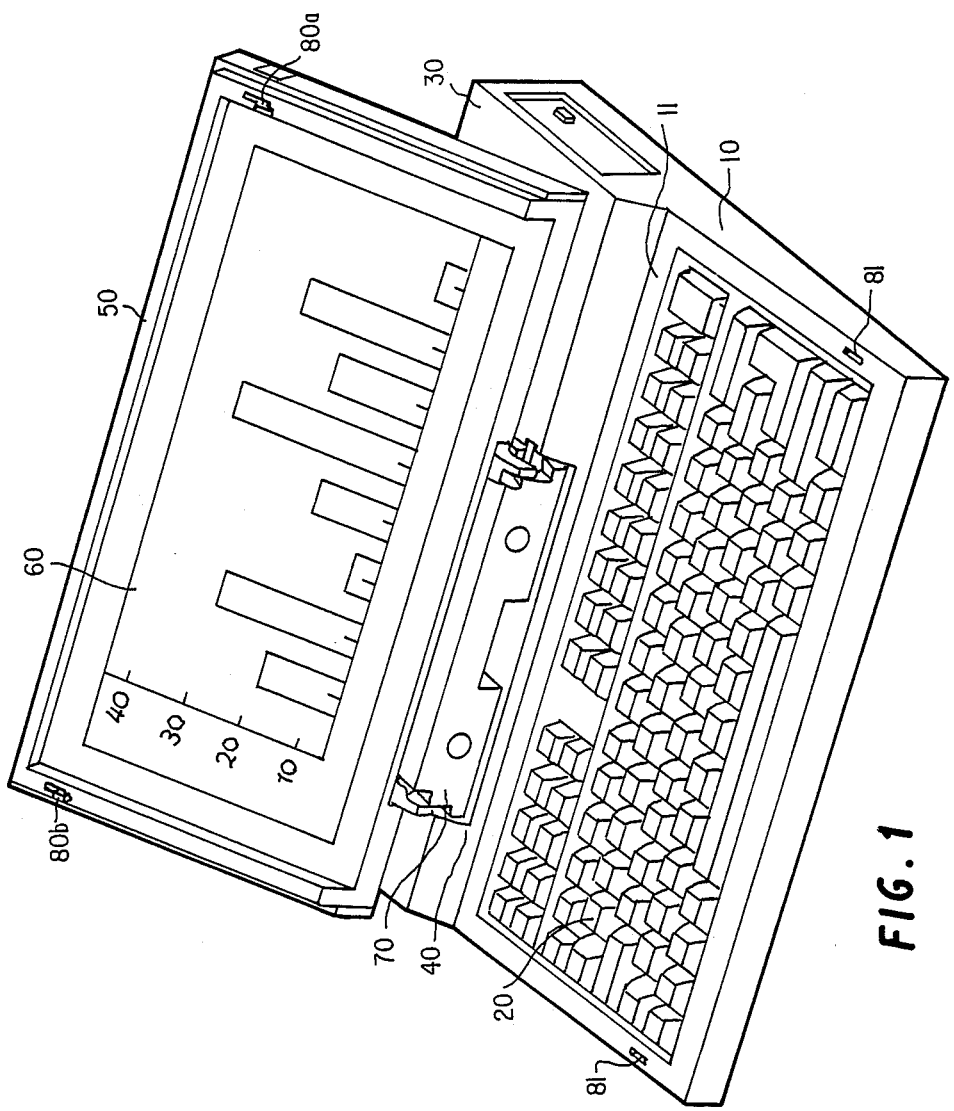
FIG. 1 is a perspective view showing the outer appearance of a personal computer, i.e., a portable apparatus according to the present invention.

FIG. 1 is a perspective view showing the outer appearance of a portable personal computer to which the present invention is applied. The personal computer comprises base 10. The base 10 has an upper surface 11. The upper surface 11 has keyboard section 20 near the front portion of it. The upper surface 11 has rear portion 30. The rear portion 30 is thicker than keyboard section 20. The rear portion 30 has a recess 40. The personal computer further comprises display unit 50 having LCD display 60. Display unit 50 is coupled to base 10 by hinge section 70 in recess 40. Display unit 50 can be folded upon keyboard section 20 and can be held up therefrom. The both sides of display unit 50 have lock mechanisms 80a and 80b. And the base 10 has two lock holes 81a and 81b. When unit 50 is folded upon keyboard section 20, lock mechanisms 80 slip into lock holes 81, whereby display unit 50 is locked to base 10.

Figure 2:
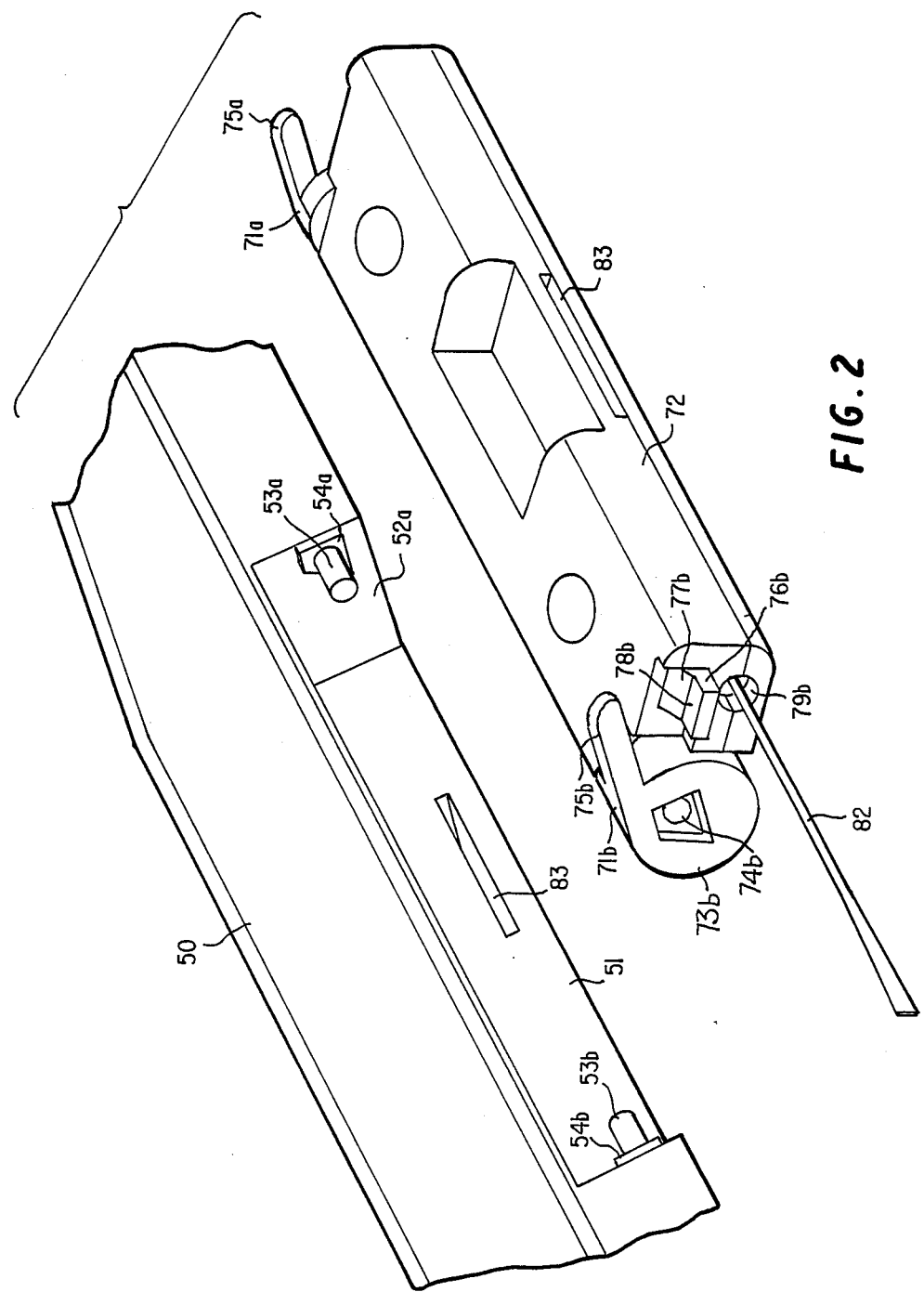
FIG. 2 is a perspective view of a mechanism coupling the display unit and hinge section of the portable apparatus.

FIG. 2 is a perspective view of a mechanism coupling display unit 50 and hinge section 70. In this figure, the same numerals are used to designate the same components as those shown in FIG. 1. As is shown in FIG. 2, hinge housing 72 has a pair of hinge shafts 71a and 71b. Shafts 71a and 71b protrude at one end from the sides of housing 72, respectively. The hinge shaft 71a has hole 74a cut in the end 73a, and also claw 76a projecting from the end 73a. And the hinge shaft 71b has hole 74b cut in the end 73b, , and also claw 76b projecting from the end 73b, too. A pair of stoppers 76a and 76b project from the sides of housing 72. Either stopper 76 has, at one end, tapered portion 77 and first stopper strip 78. Claw 76 abuts against first stopper strip 78, thereby controlling the motion of the hinge shaft 71 with respect to hinge housing 72. Two holes 79a and 79b are cut in both ends of hinge housing 72. The lower end portion of display unit 50 has a recess 51. Two bosses 53a and 53b protrude from end faces 52a, 52b of recess 51, respectively. These bosses 53 are inserted in holes 71a and 71b of hinge shafts 75a and 75b. Bosses 53 and hinge shafts 71a and 71b defines a first axis. Torsion bar 82 projects from hinge housing 72 through hole 79b. The center portion of hinge housing 72, and also in the recess 51 have elongated holes 83. A flexible cable (not shown) passes through elongated holes 83 and electrically connects base 10 and display unit 50.

Figure 3:
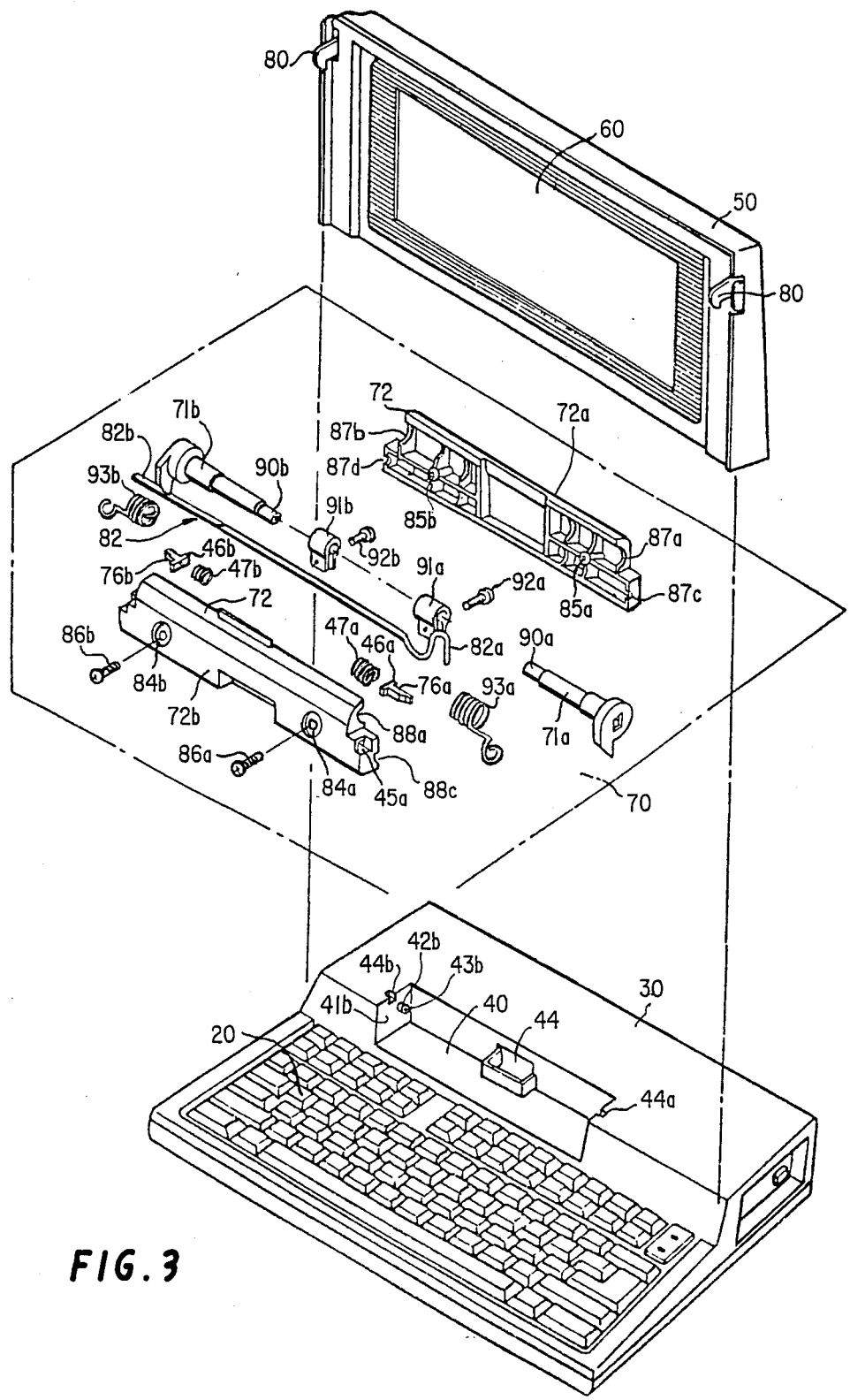
FIG. 3 is an exploded view of the hinge section.

FIG. 3 is an exploded view of the hinge section 70. In this figure, the same numerals are used to denote the same components as those shown in FIGS. 1 and 2. As is shown in FIG. 3, hinge section 72 has hinge cover 72a and hinge base 72b. Holes 84a and 84b are cut in the front wall of hinge base 72b. Screw holes 85a and 85b are cut in the inner surface of hinge cover 72a. Screws 86a and 86b are inserted through holes 84a and 84b and put in screw engagement with screw holes 85a and 85b. Hinge cover 72a and hinge base 72b are thereby coupled together. Hinge cover 72a has semicircular cutouts 87a and 87c in one side, and semicircular cutouts 87b and 87d in the other side. Hinge base 72b also has semicircular cutouts 88a and 88c in one side, and semicircular cutouts 88b and 88d in the other side. When hinge cover 72a and hinge base 72b are coupled integrally, cutouts 87a and 88a define a hole in which hinge shaft 71a is inserted, and cutouts 87b and 88b define a hole in which hinge shaft 71b is inserted. Further, when cover 72a and base 72b are coupled together, cutouts 87c and 88c form hole 79a, and cutouts 87d and 88d form hole 79b, both holes 79 being shown in FIG. 2. Inner ends 90a and 90b of hinge shafts 71a and 71b are inserted in shaft holders 91a and 91b, respectively. Shaft holders 91a and 91b are fastened to the inner surface of hinge base 72b by screws 92a and 92b. First coil springs 93a and 93b are wound around inner ends 90a and 90b of shafts 71a and 71b. Coil springs 93a and 93b are connected, at one end, to inner ends 90a and 90b, respectively. The other end of either coil spring 93 is a loop. The other end of coil spring 93a is fastened, along with holder 91a, to hinge base 72b by screw 92a. Similarly, the other end of coil spring 93b fastened, along with holder 91b, to hinge base 72b by screw 92b. A torsion bar 82 is provided within hinge housing 72. Torsion bar 82 has hook 82a at one end. Hook 82a is wrapped around screw 92a and fixed between hinge cover 72a and hinge base 72b fastened integrally by screws 92a and 92b. The other end portion 82b of torsion bar 82 is flat. This flat end portion 82b protrudes from hinge housing 72, extending through one of holes 79 of hinge housing 72. Bosses 42a and 42b are provided of side walls 41a and 41b of the recess 40. Boss 42b provided on the left side wall (FIG. 3) has a hole, in which end portion 82b of torsion bar 82 is inserted. Hole 44 is cut in the rear wall of recess 40. A flexible cable (not shown) is guided through this hole 44. Bosses 41 are inserted in holes 79 of hinge housing 72, and define a second axis. Grooves 44a and 44b are cut in the upper portions of side walls 41 of recess 40. Hinge base 72b has, in both ends, rectangular recesses 45a and 45b. As has been described, either stopper 76 has, at one end, tapered portions 77 and first stopper strips 78. At the other end, stoppers 76 have second stopper strips 46a and 46b. Further, projection 205 protrudes from the other end of stopper 200. Second coil spring 206 is wound around projection 205, and thus is provided on the side 204 of stopper 200.

Figure 4:
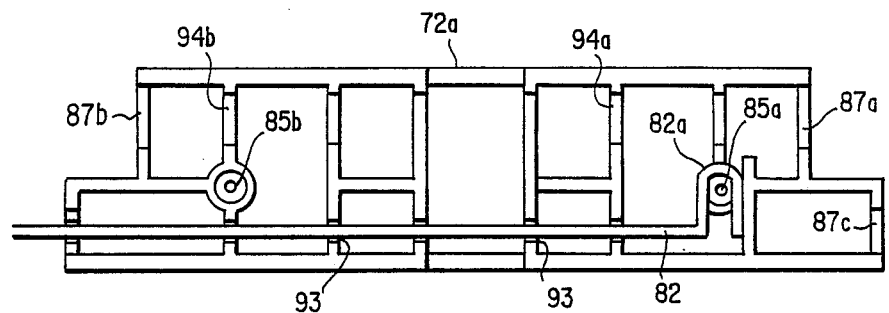
FIG. 4 is a plan view showing the internal structure of a hinge cover.

FIG. 4 illustrates the internal structure of hinge cover 72a. In this figure, the same numerals designate the same components as those shown in FIG. 3. Hook 82a of torsion bar 82 is U-shaped, and is positioned such that it surrounds screw hole 85a. Torsion bar 82 is placed in grooves 93 and guided out of hinge cover 72a. Hinge shafts 71a and 71b are provided in grooves 94a and 94b.

Figure 5:
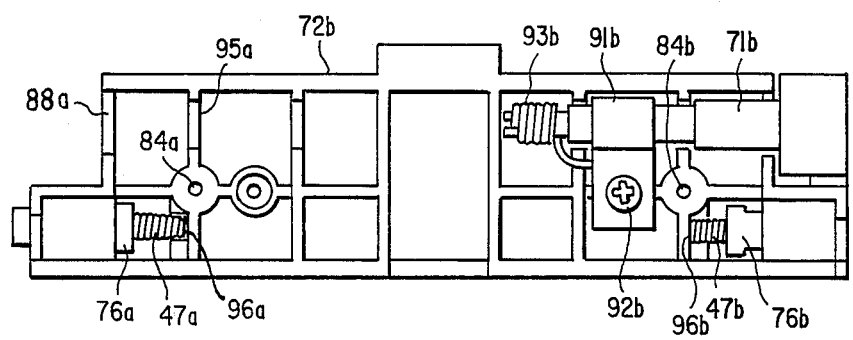
FIG. 5 is a plan view showing the internal structure of a hinge base.

FIG. 5 shows the internal structure of hinge base 72b. In FIG. 5, the same numerals designate the same components as those shown in FIG. 3. As is shown in FIG. 5, hinge shafts 71a and 71b are placed in groove 95a and 95b. Shafts 71a and 71b pass through shaft holders 91a and 91b. Shift 71a is connected to one end of coil spring 93a, and shaft 71b is connected to one end of coil spring 93b. The other end of coil spring 93a is fastened by screw 92a to hinge base 72b, along with shaft holder 91a. Similarly the other end of coil spring 93b is fastened by screw 92b to hinge base 72b, along with shaft holder 91b. Tapered portions 77 and stopper strips 78 of either stopper 76 are placed in rectangular recess 45 of hinge base 72b. Second coil springs 47a is interposed between stopper 76a and wall 96a of hinge base 72b. Second coil springs 47b is interposed between stopper 76b and wall 96b of hinge base 72b. As long as claw 75 of either hinge shaft 71 remains out of contact with stopper 78, second coil spring 47 pushes stopper strip 46 of stopper 76 onto wall 79 of hinge base 72b.

Figure 6:
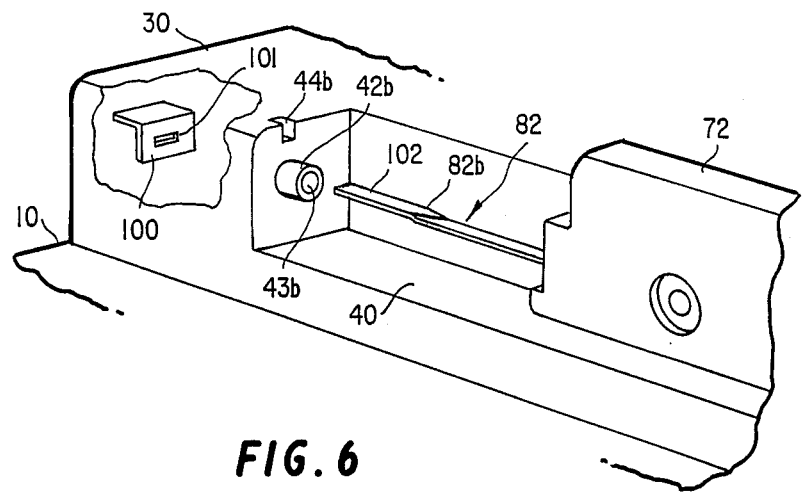
FIG. 6 is a perspective view of a part of a mechanism holding a torsion bar to the housing of the portable apparatus.

FIG. 6 is a perspective view of a part of a mechanism holding flat end portion 82b of torsion bar 82. Also in this figure, the same numerals are used to denote the same components as those shown in FIGS. 1 to 5. L-shaped bracket 100 is secured to the inner side of rear portion 30 of base 10. Bracket 100 has rectangular hole 101. Flat end portion 82b projecting from hole 79b of hingehousing 72 passes through hole 43b of boss 42b and is inserted in rectangular hole 101. Torsion bar 82 is thereby held and prevented from rotating. Rectangular hole 101 is positioned on the axis of the second axis defined by boss 42b inserted in hole 79 of hinge housing 72. Surface 102 of flat end portion 82b turns upward when hinge housing 72 is held up as is shown in FIG. 6. As long as hinge housing 72 is held up with respect to the bottom of base 10, torsion bar 82 is not twisted at all, and hence applies no force which would rotate hinge housing 72.

The operation of the embodiment described above will now be explained. First, it will be described how hinge section 70, with reference from FIG. 1 to FIG. 7 before explaining how display unit 30 is opened and closed.

Figure 7B:
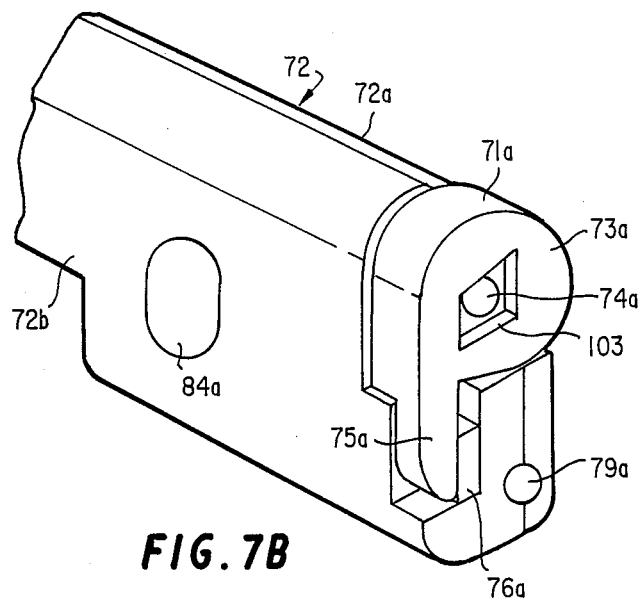
FIG. 7 is a diagram explaining the operation of the hinge section.
Figure 7D:
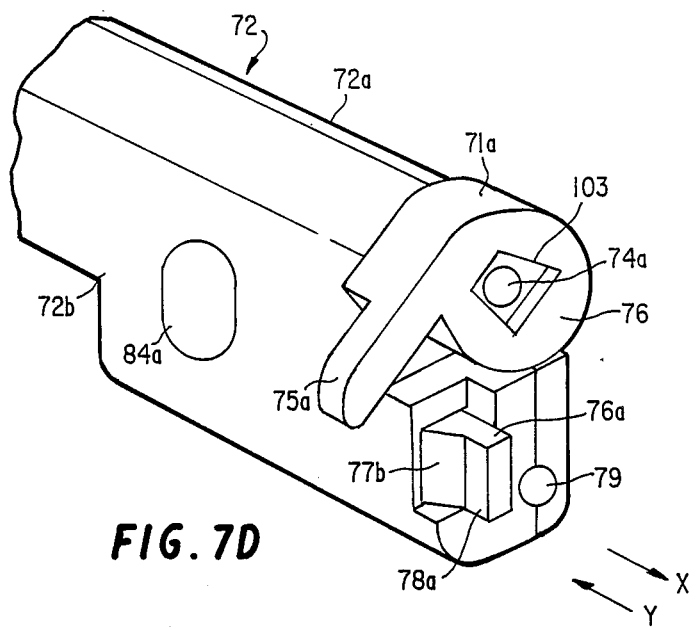

In FIG. 7, the same numerals are urged to designate the same components as those shown in FIG. 2. Rectangular recess 103 is cut in the tip of each of hinge shafts 71a and 71b. Display unit 50 has connecting section 51. Projection 54 protrudes from this section 51. Projection 54 has substantially the same size and same shape as recess 103, and is inserted in recess 103. When display unit 50 is rotated around the first axis, hinge shafts 71a and 71b also rotate. As long as hinge shafts 71a and 71b and display unit 50 remain in substantially linear alignment as is shown in FIG. 7(A) and FIG. 7(B), claw 75 of either hinge shaft is pushed onto first stopper strip 78 of stopper 76. Therefore, display unit 50 cannot be more inclined to hinge base 72a than is shown in FIG. 7(A). As the operator rotates display unit 50 around the first axis of hinge shaft 71 and thus inclines unit 50 toward hinge cover 72a as is shown in FIG. 7(C) and FIG. 7(D), hinge shafts 71a and 71b rotate, whereby their claws 75 move away from stoppers 76. As soon as claw 75 of either hinge shaft 71 moves from stoppers 76, second coil spring 47 push stopper 76 outwardly from hinge housing 72, in the direction of arrow X. Second stopper strip 46 eventually abut against wall 79 of hinge base 72b. The stopper 76 is thereby stopped. When the operator moves display unit 50 from the position shown in FIG. 7(C) back to the position shown in FIG. 7(A), claw 75 of either hinge shaft 71, which has been moved from stopper 71, comes into contact with contacts tapered portion 77 of stopper 76. As a result, claw 75 pushes stopper 76 back to the middle portion of hinge housing 72, in the direction of arrow Y, against the force of second coil spring 47.

Figure 8:
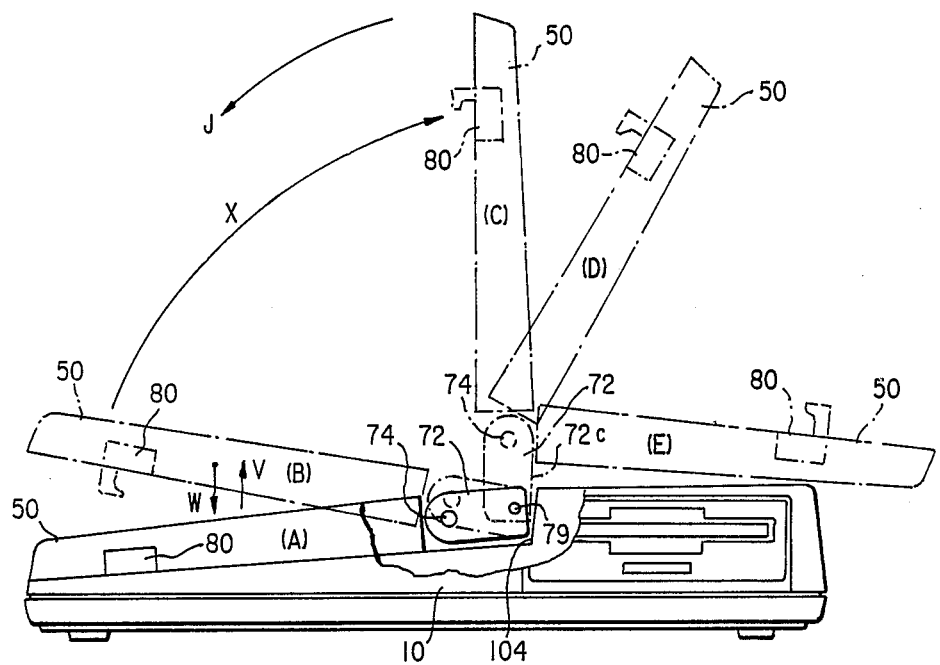
FIG. 8 is a side view of the apparatus, illustrating how the display unit is opened and closed.

FIG. 8 is a side view of the apparatus, explaining how display unit 50 is opened and closed. To facilitate understanding, the apparatus is schematically illustrated in this figure.

First, it will be described how display unit 50 is opened, or held up. As is shown in FIG. 8(A), display unit 50 is laid upon housing 10 and locked, with lock mechanism 80 engaged in lock hole 81 made in housing 10. In this condition, flat end portion 82b of torsion bar 82 is inserted in hole 101 of bracket 100. Hence, flat end portion 82b turns upward, and hinge housing 72, to which hook 82a is fixed, is laid and extending parallel to keyboard section 20. Therefore, torsion bar 82 is twisted as long as display unit 50 is laid upon base 10 as is shown in FIG. 8(A). Twisted torsion bar 82 exerts force which urges both display unit 50 and hinge section 70 to rotate in the direction of arrow Z. When the operator releases lock mechanism 80, this force rotates unit 50 and section 70 around the second axis in the direction of arrow Z, whereby display unit 50 is held up from keyboard section 20. This force is proportionate to the angle by which torsion bar 82 is twisted. This force gradually decreases as display unit 50 and hinge section 70 are held up in the direction of arrow Z. When display unit 50 reaches the position shown in FIG. 8(B) the force generated by torsion bar 82 comes into equilibrium with the weight of display unit 50. Display unit 50 is thereby stopped in this position. In other words, when display unit 50 stays in the position shown in FIG. 8(B), the force generated by bar 82 and urging unit 50 to rotate in the direction of arrow is equal to the force urging unit 50 to rotated in the opposite direction of arrow W due to its own weight. In this condition, claws 75 of hinge shafts 71a and 71b abut against first stopper strips 78 of stoppers 76. It is easier to rotate unit 50 around the second axis than around the first axis, because of first coil springs 93. For this reason, as the operator holds display unit 50 upwardly from the position shown in FIG. 8(B) in the direction of arrow Z, unit 50 and hinge housing 72 are held up in a substantially linear alignment with each other. When display unit 50 and hinge section 70 are moved to the position shown in FIG. 8(C) and are perpendicular to the bottom of base 10, surface 72c of hinge cover 72a is pressed onto rear side 104 of recess 40. As a result, hinge section 70 is prevented from rotating around the second axis. If the operator pushes display unit 50 further backwardly from the position shown in FIG. 8(C) in the direction of arrow Z, only display unit 50 can rotate around the first axis to reach the position shown in FIG. 8(D). Display unit 50 can be rotated around the first axis between the positions shown in FIG. 8(C) and 8(D). Due to the actions of hinge shafts 71a and 71b and coil springs 93, display unit 50 can be set in any position between these positions, where the operator can see the data on LCD display 60 most clearly.

When display unit 50 is rotated around the first axis in the direction of arrow Z, claws 78 of either hinge shaft 71 moves away from stopper 76 of hinge section 70, as has been explained with reference to FIG. 7. As soon as claw 78 moves from stopper 78, stopper 78 projects outwardly from hinge housing 72. If this happens when hinge housing 72 is positioned perpendicular to the bottom of base 10, either stopper 78 slips into the grooves 45a and 45b cut in recess 40. In this case, hinge housing 72 is held perpendicular to the bottom of base 10. Once hinge housing 72 has been held in this manner, display unit 50 can be rotated around the first axis in the direction of either arrow Z or arrow J, between the positions shown in FIGS. 8(C) and 8(D).

Now, it will be explained how display unit 50 is folded, or laid upon keyboard section 20.

As has been described with reference to FIG. 7, claws of hinge shafts 71a and 71b push stopper 76 inwardly of hinge housing 72 when the operator holds display unit 50 upwardly from the position shown in FIG. 8(D) to the position shown in FIG. 8(C). Hinge housing 72 is thereby released from a locked condition. When the operator pulls unit 50 from the position shown in FIG. 8(C) in the direction of arrow J, unit 50 rotates toward keyboard section 20 du to its own weight. At this time, claw 75 of either hinge shaft abuts against first stopper strip 78 of stopper 76. Therefore, both hinge shafts 71a and 71b, which rotate along with unit 50, are immovably held to hinge housing 72. As a result, display unit 50 and hinge housing 72 are rotated, remaining in a substantially linear alignment. As display unit 50 falls down from the position shown in FIG. 8(C) to the position shown in FIG. 8(B), torsion bar 82 is gradually twisted since its one end is fastened to hinge housing 72 and its other end is held by bracket 100. Hence, as unit 50 falls down, and bar 82 is twisted more, the force urging unit 50 and hinge housing 72 to rotate upwardly in the direction of arrow V increases. The force urging unit 50 to fall under the weight of unit 50 comes into equilibrium with the force generated by twisted torsion bar 82 when display unit 50 reaches the position shown in FIG. 8(B). In this position, display unit 50 is inclined at angle to keyboard section 20 of base 10. When the operator pushes unit 50 from the position shown in FIG. 8(B) in the direction of arrow J, unit 50 moves toward keyboard section 20. When unit 50 reaches the position shown in FIG. 8(A), it is laid upon keyboard section 20 and locked.

The present invention is advantageous in the following respects.

As has been described, display unit 50 and hinge section 70 are coupled by bosses 53 protruding from the sides of hinge-accommodating recess 51 and inserted in holes 77 cut in hinge shafts 75a and 75b. Housing 10 and hinge section 70 are coupled by bosses 52 protruding from the sides of hinge-accommodating recess 40 and inserted in holes 79 of hinge section 70. Thus, unit 50 and hinge section 70 are loosely coupled, and also housing 10 and hinge section 70 are loosely coupled. Due to the loose coupling, the components coupled together are unlikely to be worn, and display unit 50 can be smoothly opened and closed.

Further, torsion bar 94 is fastened, at one end, to hinge housing 74, and is held, at the other end, by housing 10. The force generated by twisted torsion bar 94 comes into in equilibrium with the force urging unit 50 to rotate downward due to the weight of unit 50 when display unit 50 reaches a position close to keyboard section 20. Hence, unit 50 automatically stops at this position before it is laid upon keyboard section 20. The gap between keyboard section 20 and unit 50 held in this position is so broad that the operator never has his or her fingers pinched between section 20 and unit 50. Safety can thus be secured to the operator in case unit 50 suddenly falls down toward keyboard section 20. In addition, the risk of damages to display unit 20, keyboard section 20 and other components can be minimized.

Moreover, as has been described, torsion bar 94 is secured, at one end, to hinge housing by a screw, has the other end, which is flat and has a rectangular cross section, inserted in the rectangular hole of bracket 43 provided on the axis of hinge section 70, and is thus prevented from rotating. In assembling hinge section 70 into the apparatus, it therefore suffices to insert the other end of torsion bar 94 into the rectangular hole of bracket 43. In other words, it is easy to incorporate torsion bar 94 into the apparatus. This helps to enhance the productivity of the apparatus.

What is claimed is:

1. A portable apparatus comprising:
    a display unit;
    a base means for pivotally supporting the display unit, the base means having an upper surface, a recess within the upper surface and a first torsion bar stopper within the base means, the recess being defined by a pair of side walls, the side walls having a first connecting means for connecting and rotating the display unit; and
    a hinge means for connecting the display unit with the base means, the hinge means including a second connecting means, connected at the first connecting means, for pivotally rotating the display unit, a second torsion bar stopper within the hinge means and a torsion bar having a first and a second end portion, the torsion bar passing through the first and second connecting means, the first end portion of the torsion bar being supported by the first torsion bar stopper and the second end portion of the torsion bar being supported by the second torsion bar stopper, rotation of the torsion bar being prevented by the first and second torsion bar stopper.

2. A portable apparatus according to claim 1, wherein the display unit including a third connecting means for pivotally connecting the hinge means at a lower end of the display unit, the hinge means including a fourth connecting means for pivotally connecting the display unit at the third connecting means.

3. A portable apparatus according to claim 1, wherein the first end of the torsion bar including a hook portion for preventing the rotation of the torsion bar within the hinge means, and the second end of the torsion bar including a flattened portion, the first torsion bar stopper including a rectangular hole for holding the second end of the torsion bar and preventing the rotation of the torsion bar within the base means.

4. A portable apparatus according to claim 3, wherein the hinge means including a hinge cover, a hinge base and a screw means for fixing between the hinge base and the hinge cover and fixing the hook portion of the torsion around the screw means within the hinge means.

5. A portable apparatus according to claim 1, wherein the first connecting means including a cylindrical boss having a first circular hole, the second connecting means including a second circular hole for covering the cylindrical boss, whereby the hinge means and the display unit rotating around the cylindrical boss and the torsion bar passing through the first and second circular holes.

* * * * *